United States Patent
Cocolios et al.

(10) Patent No.: US 7,147,758 B2
(45) Date of Patent: Dec. 12, 2006

(54) METHOD FOR SURFACE TREATMENT OF POLYMERIC SUBSTRATES

(75) Inventors: Panayotis Cocolios, Bullion (FR); François Coeuret, Guyancourt (FR); Franck Forster, Hamburg (DE); Jean-Louis Gelot, Elancourt (FR); Bernd Martens, Hamburg (DE); Eckhard Prinz, Hamburg (DE); Géraldine Rames-Langlade, Chaville (FR); Alain Villermet, Viroflay (FR)

(73) Assignees: L'Air Liquide, Societe Anonyme A' Directoire et Conseil de Surveillance pour l'Etude Et. l'Exploitation des Procedes Georges Claude, Paris (FR); SOFTAL Electronic Erik Blumentfeld GmbH Co, Hamburg (DE)

(*) Notice: Subject to any disclaimer, the term of this patent is extended or adjusted under 35 U.S.C. 154(b) by 372 days.

(21) Appl. No.: 10/203,501

(22) PCT Filed: Jan. 22, 2001

(86) PCT No.: PCT/FR01/00202

§ 371 (c)(1),
(2), (4) Date: Oct. 24, 2002

(87) PCT Pub. No.: WO01/58992

PCT Pub. Date: Aug. 16, 2001

(65) Prior Publication Data

US 2003/0075432 A1    Apr. 24, 2003

(30) Foreign Application Priority Data

Feb. 11, 2000  (EP) .................... 00400403

(51) Int. Cl.
*B01J 19/08* (2006.01)

(52) U.S. Cl. .................. 204/164; 204/165

(58) Field of Classification Search ............. 204/164, 204/165; 422/186.05
See application file for complete search history.

(56) References Cited

U.S. PATENT DOCUMENTS

| 3,661,735 A | * | 5/1972 | Drelich ................. 204/165 |
| 4,216,254 A |   | 8/1980 | Lundell et al. |
| 4,297,187 A |   | 10/1981 | Deguchi et al. |
| 4,563,316 A |   | 1/1986 | Isaka et al. |
| 5,576,076 A |   | 11/1996 | Slootman et al. |
| 5,972,176 A | * | 10/1999 | Kirk et al. ............. 204/164 |
| 6,106,659 A | * | 8/2000 | Spence et al. ......... 156/345.43 |

FOREIGN PATENT DOCUMENTS

| EP | 0 010 632 | 5/1980 |
| EP | 0 516 804 | 7/1992 |
| EP | 0 622 474 | 11/1994 |
| EP | 0 679 680 | 11/1995 |
| JP | 05-059197 A | * 9/1993 |

OTHER PUBLICATIONS

International Search Report for PCT/FR01/00202.
Inagaki N: "Plasma surface modification and plasma polymerization", Laboratory of Polymer Chemistry at Shizuoka University, TECHNOMIC Publishing Co., Inc., 1996.
Patent Abstracts of Japan, publication No. 05059197, publication date Mar. 9, 1993, application date Aug. 30, 1991, application No. 03220327.

* cited by examiner

*Primary Examiner*—Kishor Mayekar
(74) *Attorney, Agent, or Firm*—Christopher J. Cronin; Brandon S. Clark

(57) ABSTRACT

Methods for treating polymeric substrates by placing the substrate in a gaseous mixture and subjecting it to a dielectric barrier electrical discharge. The gaseous mixture, which has a pressure around atmospheric, contains a carrier gas, a reducing gas and an oxidizing gas. The amount of the oxidizing gas in the gas mixture is between about 50 ppm and about 2000 ppm by volume, while the amount of the reducing gas in the gas mixture is between about 50 ppm and 30000 ppm by volume.

10 Claims, No Drawings

METHOD FOR SURFACE TREATMENT OF POLYMERIC SUBSTRATES

This application is a 35 U.S.C. 371 National Stage filing of PCT/FR01/00202 on Jan. 22, 2001.

BACKGROUND

The present invention relates to the field of surface treatments of polymer substrates, which are widely used in very many industries, especially the packaging and thermal insulation industries, or for the manufacture of insulating electrical compounds.

Nevertheless, these materials often have surface properties which make them difficult to use in conversion processes such as printing or bonding, in which processes the wetting of the substrate and its adhesion to a coating (ink, adhesive, varnish, etc.) are absolutely essential: this is because their low wettability, resulting from their structure, makes it very difficult for example to apply inks or adhesives to such surfaces.

Many types of surface treatment (preparation) of polymer substrates have therefore been developed on an industrial scale for improving their properties. These surface treatments are used by polymer film producers and by subsequent converters (printing of packaging films, manufacture of electrical capacitors, etc.).

Among the methods most widely used for carrying out these surface treatment operations are in particular liquid-phase methods.

Aside the fact that these liquid-phase methods unquestionably pose problems as regards the environmental protection standards which are becoming increasingly strict, it should also be pointed out that the application of these liquid-phase methods proves to be very tricky and difficult to control.

In this context, a second category of polymer surface treatment methods has made its appearance, which methods are termed "dry methods".

In this category, mention may be made of the example of flame brushing treatments, which have been used for a long time in this industry, but the significant thermal effect of which makes them not easily compatible with thin substrates (films or sheets).

SUMMARY

In this category of dry treatments, mention may also be made of low-pressure plasma surface treatments for the purpose of introducing onto the surface of the polymer chemical functionalities/groups such as amine, amide, nitrile, or carbonyl, carboxyl or other alcohol or ester groups, and thus change the surface properties of the polymer in order to give it, for example, a certain hydrophilicity. This category of low-pressure treatment may be illustrated with the aid of the work by N. Inagaki dating from 1996 ("*Plasma surface modification and plasma polymerization*", Laboratory of Polymer Chemistry at Shizuoka University, TECHNOMIC Publishing Co. Inc.), and by document EP-A-679 680 which relates to low-pressure plasma treatments using mixtures containing 20 to 60% $CO_2$ or 40 to 80% $N_2O$. These methods are in a first approach very attractive as they have the advantage of being very environmentally friendly, but their great potentiality cannot hide their major drawbacks associated with the fact that they are carried out at reduced pressure in batch mode, and are therefore incompatible with the treatment of large polymer surfaces or with the high production rates that have to be achieved in continuous mode.

Again, within this "dry" surface treatment category, it should be pointed out that the treatment most used in industry is treatment of the polymer by electrical discharge in air at atmospheric pressure (also called "corona treatment" in the industry). Despite the very widespread nature of this treatment, one cannot ignore the fact that the surface energy values obtained by this treatment are too low in the case of certain polymers, such as polypropylene, and that in addition they rapidly decrease over time (poor aging).

It should therefore be pointed out that the Applicant has, in documents EP-A-516 804 and EP-A-622 474, proposed a process for surface treatment of polymer substrates during which the substrate is subjected to an electrical discharge with a dielectric barrier, in an atmosphere containing a carrier gas, a silane and an oxidizing gas, at a pressure substantially equal to atmospheric pressure, for the purpose of depositing a silicon-based layer on the surface of the substrate. As these documents indicate, the processes in question undoubtedly give rise to excellent surface properties, but it is recognized that the use of a silane introduces a further cost which is not always acceptable to the industry concerned (low added-value applications).

Mention may also be made, in this field of surface treatment methods using atmospheric pressure electrical discharges, the work by the company Toray Industries, in particular those reported in document EP-A-10 632, in which the author reports the results of surface treatments of polymer substrates, in which a corona discharge is created at atmospheric pressure in a nitrogen/$CO_2$ mixture, the $CO_2$ content of the mixture ranging, approximately, from 5000 ppm to 50%. All the examples given in the document clearly show that the best treatment results, for example in terms of surface energy (energy of 60 dynes/cm and higher), are obtained for $CO_2$ contents of several % or even several tens of % in the mixture.

Within this context of existing methods, the studies pursued by the Applicant on this subject have shown the need to propose new conditions for the surface treatment of polymer substrates by electrical discharge, for the following reasons:

- the needs in terms of surface properties (surface energy, wettability, etc.) are very different from one sector of the industry to another; for example, between a polymer film producer, who will require very good retention of the surface energy of the films with time (taking into account the storage times of the products before their conversion) and a converter who will very often require immediate good properties (for example when applying his printing treatment);
- the processes according to the prior art usually offer very high properties, higher than needed for some industrial applications which could, for example, be satisfied with much lower surface energy values.

The objective of the present invention is therefore to provide a solution to the abovementioned technical problems by proposing, in particular, novel conditions for treating polymer surfaces by electrical discharge making it possible to control the chemical nature of the functional groups grafted onto the treated surface and their surface density, and thus provide the properties required by each user site, under economical conditions.

The objective of applying the surface treatment according to the invention will therefore be to facilitate the application of a subsequent operation, for example, to facilitate the bonding of an ink, varnish or adhesive coating.

The method for surface treatment of polymer substrates according to the invention, in which the substrate is subjected to an electrical discharge with dielectric barrier, in a treatment gas mixture containing a carrier gas and a reducing gas and/or an oxidizing gas, at a pressure approximately equal to atmospheric pressure, is then characterized by the use of the following arrangements:

when the treatment mixture contains an oxidizing gas, the content of oxidizing gas in the mixture lies within a range from 50 to 2000 ppmv;

when the treatment gas mixture contains a reducing agent, the content of reducing gas in the mixture lies within a range from 50 to 30 000 ppmv.

DESCRIPTION OF PREFERRED EMBODIMENTS

The method according to the invention may moreover adopt one or more of the following technical features:

when the treatment mixture contains an oxidizing gas, this oxidizing gas is $CO_2$ or $N_2O$ or $H_2O$ or a mixture of these gases;

the treatment mixture contains a carrier gas, an oxidizing gas and a reducing gas and, with R being the ratio of said content of reducing gas to said content of oxidizing gas in the mixture, 0<R<15;

the content of oxidizing gas in the treatment mixture lies within a range from 100 to 1000 ppmv, the ratio of said content of reducing gas to said content of oxidizing gas in the mixture, lying in the range $0.5 \leq R \leq 8$;

said contents and said ratio R of said content of reducing gas to said content of said oxidizing gas in the treatment mixture are adjusted so as to obtain a surface energy of the products thus treated which is at an intermediate level such that it lies within the range from 40 to 50 mN/meter;

said contents and said ratio R of said content of reducing gas to said content of oxidizing gas in the treatment mixture are adjusted so as to obtain the surface energy of the products thus treated which is greater than 50 mN/meter;

said reducing gas is hydrogen;

the substrate was subjected beforehand to a pretreatment by passing it through an electrical discharge with dielectric barrier, at a pressure approximately equal to atmospheric pressure, in a pretreatment gas mixture consisting of air or an inert gas, this inert gas preferably being nitrogen, argon or helium, or a mixture of these gases;

said substrate is in the form of a sheet;

said substrate is in the form of a film;

said substrate is in the form of a foam;

said substrate consists of woven or nonwoven polymer fibers;

the polymer is a polyolefin, a vinyl polymer, a polystyrene, a polyester, a polyamide or a polycarbonate;

the carrier gas is an inert gas;

the carrier gas is nitrogen or argon or helium, or a mixture of these gases.

As will have been understood on reading the foregoing, the notion of an "oxidizing gas" according to the present invention covers very generally oxygen and gases capable of liberating oxygen. Nevertheless, according to the present invention, it is preferred to use $CO_2$ or $N_2O$ or $H_2O$ or a mixture of these gases.

Likewise, although the case of hydrogen as reducing gas has been most particularly illustrated in the foregoing, it should be understood that many other gases fall within this category without at any moment departing from the scope of the present invention.

It will now be shown below, with the aid of many illustrative examples, that the present invention does actually provide the surface properties required by each type of user site, whether these are immediate properties or properties to be maintained over time, under remarkably economical conditions.

It will also be shown in the following analysis that these conditions and results are in contradiction to what hitherto the existing literature has stated.

A first example of surface treatment (partially in accordance with the invention), on a commercially available additive-free polypropylene film 15 microns in thickness, is described here, this film being coated by various $N_2/CO_2$ mixtures, for a film run rate of 50 m/min and a specific discharge power of 60 Wmin/m². In each case, the surface energy, together with the result of an adhesion test, is measured, the adhesion test being called "90° tape test" widely used in the industry, and in which a rating of 1 to 5 is assigned (use on this occasion of the 4104 tape of the Tesa™ brand).

The following results (table 1) are therefore obtained for this first example.

TABLE 1

| $CO_2$ content in the mixture | Surface energy just after treatment (mN/m) | 90°adhesion test |
| --- | --- | --- |
| 500 ppm | 58 | 4/5 rating |
| 500 ppm | 58 | 3/5 rating |
| 10% | 52 | 3/5 rating |

It is therefore immediately apparent on examining the results in table 1 that, contrary to what the literature cited above in the present application states, excellent results both in terms of surface energy and adhesion are obtained for low $CO_2$ contents. Although some degradation occurs in the case of contents reaching 10% (a fortiori several tens of %).

Illustrated below (table 2) within the context of a second example of surface treatment (partially in accordance with the invention) is the influence of hydrogen on the results obtained. The film treated here is the same as that in example 1, as is likewise the run speed, whereas the specific discharge power is in this case 35 Wmin/m².

TABLE 2

| Gas mixture | Contents (ppm) | Surface energy just after treatment (mN/m) |
| --- | --- | --- |
| $N_2/CO_2$ | 250 ppm of $CO_2$ | 52 |
| $N_2/CO_2$ | 500 ppm of $CO_2$ | 55 |
| $N_2/CO_2/H_2$ | 250 ppm of $CO_2$ and 250 ppm of $H_2$ | 58 |
| $N_2/H_2$ | 250 ppm of $H_2$ | 55 |
| $N_2/H_2$ | 500 ppm of $H_2$ | 56 |
| Air | // | 34 |

This table therefore shows the benefit of the ternary mixture for this polymer, including for low $CO_2$ and hydrogen contents.

As regards table 3 below, this illustrates, within the context of a third example of implementation of the invention, the influence of the $H_2/N_2O$ ratio (in an $N_2/N_2O/H_2$ atmosphere containing 250 ppm $N_2O$) on the observed results.

For this third example, the treated film is the same as that of example 1, the run speed is in this case 80 m/min, while the specific power of the discharge is in this case 25 $Wmin/m^2$.

This table 3 therefore shows that the value of the $H_2/N_2O$ ratio exerts an influence on the results obtained immediately after treatment, and that the higher the $H_2$ ratio the better the results (this being valid up to a certain level of the $H_2/N_2O$ ratio).

Moreover, it will be noted that the results after 100 days of aging (not indicated in the table) show a relatively constant result at 40 mN/m, whatever the $H_2/N_2O$ ration (as an illustration, it may be noted that a value of 34 mN/m is obtained, under the same 100 day aging conditions, for the case of an air corona treatment of this same film).

TABLE 3

| $H_2/N_2O$ ratio | Surface energy just after treatment (mN/m) |
| --- | --- |
| 0 (=$N_2/N_2O$) | 44 |
| 0.5 | 42 |
| 1 | 42 |
| 2 | 44 |
| 4 | 46 |
| 8 | 46 |

Table 4 below illustrates, within the context of a 4th example of implementation of the invention, the influence of the $H_2/CO_2$ ratio (in an $N_2/CO_2/H_2$ atmosphere containing 500 ppm $CO_2$) on the observed results.

For this 4th example, the treated film is the same as that of example 1, the run speed in this case being 50 m/min while the specific power of the discharge is in this case 50 $Wmin/m^2$.

It may therefore be clearly seen that, in the above case, the $H_2/CO_2$ ratio has only a slight influence on the results at t=0, whereas on the other hand at 100 days its influence is strong.

Table 5 below illustrates the effect of the specific power on the results obtained, for the same film as previously, the treatment gas mixture being an $N_2/N_2O$ mixture containing 250 ppm $N_2O$.

The results in table 5 make it possible to state the fact that the higher the power the more the performance improves, including in aging (but it should also be noted that the higher the power the greater the relative degradation over time).

TABLE 4

| $H_2/N_2O$ ratio | Surface energy just after treatment (mN/m) | Surface energy at t = 100 days (mN/m) |
| --- | --- | --- |
| $N_2/CO_2$ 500 ppm | 58 | 46 |
| 0.5 | 60 | 44 |
| 1 | 60 | 46 |
| 2 | 60 | 48 |
| 4 | 60 | 42 |
| 8 | 60 | 52 |

TABLE 5

| Specific power $Wmin/m^2$ | Run speed | Energy immediately after treatment | Energy at t = 100 days (mN/m) |
| --- | --- | --- | --- |
| 25 | 80 m/min | 44 | 42 |
| 35 | 50 m/min | 48 | 40–44 |
| 50 | 50 m/min | 58 | 48 |

Table 6 therefore illustrates the comparative effect of a corona pretreatment in air according to the invention, on the one hand, on the polymer already mentioned within the context of examples 1 to 5 (additive-free polypropylene) and, on the other hand, on a polypropylene with additives (commercially available source). The main treatment according to the invention is carried out using a run speed of 50 m/min and a specific power of 50 $Wmin/m^2$, the treatment mixture used being an $N_2/CO_2/H_2$ mixture containing 500 ppm $CO_2$ and 500 ppm hydrogen.

It may therefore be clearly seen that the behavior of these two types of substrate with respect to the pretreatment are not identical: in the case of the additive-free polypropylene the pretreatment has degraded the surface, resulting in a fall in performance, whereas in the case of the polypropylene with additives, the effect of the pretreatment is unquestionably favorable.

TABLE 6

| Film | Pretreatment at 50 $Wmin/m^2$ | Energy immediately after treatment (mN/m) |
| --- | --- | --- |
| PP with additives | No | 44 |
| PP with additives | Yes | 54 |
| PP without additives | Yes | 41 |

It may therefore be understood that it has been very effectively demonstrated, by means of the many examples above, that the present invention provides novel conditions for the surface treatment of polymer substrates by a dry method, making it possible actually to provide the surface properties required by each type of user site, whether this site requires immediate surface properties or whether it requires properties to be maintained over time, under remarkably economical conditions (use of inexpensive gas with, notwithstanding, active gas contents which are extremely low compared with what is recommended in the existing literature).

Again, as will have been understood on reading the foregoing, although the present invention has been described in relation to particular embodiments, it is not in any way limited thereby but, on the contrary, is capable of modifications and variants which will be apparent to a person skilled in the art within the context of the claims hereinbelow. Thus, although in the foregoing the families of very commonly used polymers, whether polystyrenes or polyolefins, have been most particularly stipulated, it will have been understood that the present invention provides a technical response to all types of application, including on less commonly used polymers such as polyamides or even polyacrylonitriles, these being given by way of entirely nonlimiting illustration of the many families of polymers used in industry.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for surface treatment of polymer substrates, the method comprising:
    a) providing a treatment gas comprising:
        1) a carrier gas;
        2) between about 50 ppmv and about 2000 ppmv of an oxidizing gas, said oxidizing gas comprising $N_2O$, $CO_2$, a mixture of $N_2O$ and $CO_2$, a mixture of $H_2O$ and N2O, or a mixture of $H_2O$ and $CO_2$; and
        3) between about 50 ppmv and about 30 000 ppmv of a reducing gas;
    b) providing a substrate; and
    c) subjecting the substrate, in the presence of the treatment gas and at substantially atmospheric pressure, to an electrical discharge from a dielectric barrier.

2. The surface treatment method as claimed in claim 1, wherein the content of the oxidizing gas in the treatment mixture is within the range of from about 100 to about 1000 ppmv.

3. The surface treatment method as claimed in claim 1, wherein the reducing gas is hydrogen.

4. The surface treatment method as claimed in claim 1, wherein the ratio of the content of the reducing gas to the content of the oxidizing gas in the mixture is R, wherein R is in the range of 0<R<15.

5. The surface treatment method as claimed in claim 4, wherein the ratio R is in the range of $0.5 \leq R \leq 8$.

6. The surface treatment method as claimed in claim 4, wherein the contents and the ratio R are adjusted so as to obtain a surface energy of the substrates thus treated which is at an intermediate level such that is in the range of from about 40 to about 50 mN/in.

7. The surface treatment method as claimed in claim 4, wherein the contents and the ratio R are adjusted so as to obtain a surface energy of the substrates thus treated which is greater than 50 mN/m.

8. The surface treatment method as claimed in claim 1, wherein the polymer is a polyolefin, a vinyl polymer, a polystyrene, a polyester, a polyamide or a polycarbonate.

9. The surface treatment method as claimed in claim 1, wherein the carrier gas is an inert gas.

10. The surface treatment method as claimed in claim 9, wherein the carrier gas is nitrogen or argon or helium, or a mixture of these gases.

* * * * *

UNITED STATES PATENT AND TRADEMARK OFFICE
CERTIFICATE OF CORRECTION

PATENT NO. : 7,147,758 B2  Page 1 of 1
APPLICATION NO. : 10/203501
DATED : December 12, 2006
INVENTOR(S) : Panayotis Cocolios et al.

It is certified that error appears in the above-identified patent and that said Letters Patent is hereby corrected as shown below:

In Column 8, Claim 6, line 13, replace the words "mN/in" with --mN/m--

Signed and Sealed this

Thirteenth Day of March, 2007

JON W. DUDAS
*Director of the United States Patent and Trademark Office*